United States Patent
Deyra et al.

(10) Patent No.: US 9,841,656 B2
(45) Date of Patent: Dec. 12, 2017

(54) FREQUENCY CONVERTER SYSTEM CONVERSION CELL AND FREQUENCY CONVERSION SYSTEM

(71) Applicants: Centre National de la Recherche Scientifique—CNRS, Paris (FR); Institut d'Optique Graduate School, Palaiseau (FR); Université Paris-Sud, Orsay (FR)

(72) Inventors: Loïc Deyra, Palaiseau (FR); François Balembois, Boissy le Sec (FR); Patrick Georges, Noisy le Roi (FR)

(73) Assignees: CENTRE NATIONAL DE LA RECHERCHE SCIENTIFIQUE-CNRS, Paris (FR); Institut d'Optique Graduate School, Palaiseau (FR); Université Paris-Sud, Orsay (FR)

( * ) Notice: Subject to any disclaimer, the term of this patent is extended or adjusted under 35 U.S.C. 154(b) by 0 days.

(21) Appl. No.: 15/311,865

(22) PCT Filed: May 19, 2015

(86) PCT No.: PCT/EP2015/061023
§ 371 (c)(1),
(2) Date: Nov. 17, 2016

(87) PCT Pub. No.: WO2015/177169
PCT Pub. Date: Nov. 26, 2015

(65) Prior Publication Data
US 2017/0090270 A1    Mar. 30, 2017

(30) Foreign Application Priority Data
May 20, 2014  (FR) ..................... 14 54514

(51) Int. Cl.
*G02F 1/35* (2006.01)
*G02F 1/01* (2006.01)

(52) U.S. Cl.
CPC .......... *G02F 1/3544* (2013.01); *G02F 1/0131* (2013.01); *G02F 1/3501* (2013.01); *G02F 2001/3546* (2013.01)

(58) Field of Classification Search
CPC .... G02F 1/0131; G02F 1/3501; G02F 1/3544; G02F 2001/3546
See application file for complete search history.

(56) References Cited

U.S. PATENT DOCUMENTS

| 7,072,368 B2 * | 7/2006 | Mizell | H01S 3/0627 372/21 |
| 8,462,824 B2 * | 6/2013 | Popmintchev | G02F 1/353 372/21 |

(Continued)

FOREIGN PATENT DOCUMENTS

| DE | 199 28 661 A1 | 3/2001 | |
| JP | H04330426 A | 11/1992 | |
| JP | 2001183712 A * | 7/2001 | G02F 1/37 |

OTHER PUBLICATIONS

Mann et al., "Influence of mechanical stress of the conversion efficiency of KTP and LBO", Europto Conference on Laser Metrology and Inspection, SPIE vol. 3823, Jun. 1999, pp. 289-297.*

(Continued)

*Primary Examiner* — Daniel Petkovsek
(74) *Attorney, Agent, or Firm* — Osha Liang LLP

(57) ABSTRACT

A frequency converter system includes a source that emits a beam having a wide spectral band; and a frequency conversion cell including 1) a birefringent nonlinear crystal having a first phase-matching wavelength, with an input face that receives the beam, an output face that emits at least one frequency-converted beam, and at least two parallel faces (Continued)

different from the input and output faces; 2) means for applying an external mechanical force to at least one of said two parallel faces, resulting in a variation in the birefringence of the nonlinear crystal, the value of the applied external mechanical force being determined so as to obtain phase matching at a second phase-matching wavelength different from the first phase-matching wavelength; and 3) means for adjusting the external mechanical force for wavelength tunability in the frequency conversion cell.

11 Claims, 6 Drawing Sheets

(56) References Cited

U.S. PATENT DOCUMENTS 9,140,958 B2 * 9/2015 Harada ............... G02F 1/3558
9,529,244 B2 * 12/2016 Dam ................... G02F 1/3534

OTHER PUBLICATIONS

International Search Report issued in corresponding application No. PCT/EP2015/061023 dated Sep. 7, 2015 (6 pages).
Written Opinion of the International Searching Authority issued in corresponding application No. PCT/EP2015/061023 dated Sep. 7, 2015 (6 pages).
Search Report issued by the French National Institute of Industrial Property in corresponding application No. FR1454514 dated Jan. 26, 2015 (2 pages).

* cited by examiner

Type I

FREQUENCY CONVERTER SYSTEM CONVERSION CELL AND FREQUENCY CONVERSION SYSTEM

PRIOR ART

Technical Field of the Invention

The present invention relates to a conversion cell for an optical frequency converter system, an optical frequency converter system, and a frequency conversion method.

Prior Art

Second-order nonlinear optical processes, such as second harmonic generation or parametric amplification, are quite commonly used to modify the emission wavelengths of laser sources and have numerous applications in the scientific and industrial world, for example laser machining or spectroscopy. Thus, second harmonic generation (or SHG) makes it possible to divide the wavelength of a wave emitted by a laser source in two, and to change for example from 1064-nm infrared laser to 532-nm green laser.

In frequency conversion processes like second harmonic generation, what is sought is for fundamental and harmonic waves to propagate at the same group speed in order to achieve high conversion efficiency. One method for propagating two waves of different wavelengths through the same material without phase-shifting is birefringent phase matching (or BPM). Birefringent phase matching uses the asymmetry of the refractive indices of a birefringent crystal between its crystallographic axes to compensate the phase accumulated by each of the two waves during propagation.

FIG. 1A thus shows the refractive indices of BBO (beta barium borate or $\beta$-$BaB_2O_4$) along the two crystallographic axes, respectively called the ordinary index $n_o(\lambda)$ and the extraordinary index $n_e(\lambda)$ as a function of the wavelength. In this figure, we see that the optical index of BBO at 0.42 µm on the ordinary axis is equal to the index of BBO at 0.21 µm on the extraordinary axis. There is therefore birefringent phase matching in BBO for second harmonic generation starting at 420 nm if the incident wave is polarized along the ordinary axis of BBO. This results in the generation of a 210-nm wave output from the crystal that is polarized along the extraordinary axis of the crystal. This example ($no(\omega)$ =$ne(2\omega)$) is actually quite rare (known as "type-1 non-critical phase matching" or "NCPM") and does not make it possible to choose a desired wavelength to be frequency doubled.

It is possible, however, to send the incident wave through the crystal with a polarization forming an angle $\theta$ with one of the crystallographic axes, as illustrated in FIG. 1B. One of the waves ($\omega$ or $2\omega$) therefore sees an optical index $n(\theta)$ between no and ne. Thus, in order to obtain the phase matching for second harmonic generation, for example, the cut angle of the nonlinear crystal can be modified. This method makes it possible to obtain phase matching in a wide frequency band (typically several microns), but it introduces a deviation effect (known as a double refraction or "walk-off" effect) between the fundamental and harmonic waves, which reduces the conversion efficiency and degrades the quality of the beam.

The operating temperature of the crystal can also be modified in order to adjust the frequency range in which the phase matching is obtained. For certain crystals, it is thus possible to choose both the cut angle and the temperature so that the fundamental and harmonic waves propagate not only in phase, but also in the same direction (angular non-critical phase matching), as described for example in an LBO (lithium triborate or $LiB_3O_5$) crystal in the article by T. Ukachi et al. ("Measurements of non-critically phase-matched second-harmonic generation in a LBO crystal," Appl. Phys. A Mater. Sci. Process 280, 279-280 (1973)).

Despite these degrees of freedom in terms of angle and temperature, the intrinsic indices of nonlinear crystals limit their phase-matching capabilities. For example, the shorter the desired wavelength of the beams to be generated by frequency conversion, the more limited the choice of nonlinear crystals. Temperature phase matching is limited by the small variation in the indices, and by the fact that the temperature range applicable by an oven (or a Peltier element) is generally limited to the range of [−20° C.-200° C.].

The present description proposes an original method for modifying the phase matching properties of a birefringent nonlinear crystal based on the application of a mechanical stress to the crystal in order to modify the refractive indices. The method thus described makes it possible to expand the phase matching capabilities of certain nonlinear crystals.

SUMMARY OF THE INVENTION

According to a first aspect, the invention relates to a frequency conversion cell comprising:

a birefringent nonlinear crystal characterized by a first phase-matching wavelength, having an input face for receiving at least one incident beam, an output face for emitting at least one frequency-converted beam, and at least two parallel faces different from the input and output faces;

means for applying an external mechanical force to at least one of said parallel faces, called a force application face, resulting in a variation in the birefringence of the nonlinear crystal, the value of the applied external mechanical force being determined so as to obtain phase matching in the nonlinear crystal at a second phase-matching wavelength different from the first phase-matching wavelength.

The applicants have demonstrated both theoretically and experimentally that the variation in the birefringence of the nonlinear crystal resulting from the stress to which the crystal is subjected by the application of an external mechanical force to at least one of its parallel faces makes it possible to modify the operating wavelength of the conversion cell and thus obtain phase matching at wavelengths at which this was heretofore impossible or difficult.

Frequency conversion processes include, for example according to the present description, sum frequency generation (or SFG), difference frequency generation (or DFG), second, third or fourth harmonic generation, optical parametric generation, and optical parametric amplification.

Advantageously, the birefringent nonlinear crystal is a rectangular parallelepiped, cut along its principal planes, each defined by two crystallographic axes of the crystal. The crystal is thus made to receive one or more incident beam(s) with an axis of propagation perpendicular to the input face. This advantageous configuration makes it possible to increase the fracture threshold and optimize the variation in the birefringence of the crystal as a function of the external mechanical force applied. The phase matching is therefore a type I non-critical phase matching.

According to a variant, the crystal can be cut along planes other than the principal planes, which makes it possible to obtain different types of phase matching.

The birefringent nonlinear crystal can generally be any nonlinear crystal having phase matching for a frequency conversion process at a given frequency.

Advantageously, the birefringent nonlinear crystal is chosen from the borate family, for example and without limitation LBO (lithium triborate or $LiB_3O_5$), LTB (lithium tetraborate or $LB_4$), BBO (beta barium borate or $\beta$-$BaB_2O_4$), BiBO (bismuth borate or $BiB_3O_6$), CLBO (cesium lithium borate or $CsLiB_6O_{10}$), YCOB ($YCa_4O(BO_3)_3$) or GdCOB ($GdCa_4O(BO_3)_3$) and all of the mixed chemical compositions such as for example, GdxY(1-x)COB with x ranging from 0 to 1; the nonlinear crystal can also be chosen from titanyl-based crystals such as, for example and without limitation, KTP (potassium titanyl phosphate or $KTiOPO_4$), KTA (potassium titanyl arsenate or $KTiOAsO_4$), RTP (rubidium titanyl phosphate or $RbTiOPO_4$), RTA (rubidium titanyl arsenate or $RbTiAsPO_4$); the nonlinear crystal can also be chosen from one of the following crystals: KDP (potassium dihydrogen phosphate or $KH_2PO_4$), KD*P (potassium deuterium phosphate or $KD_2PO_4$), LN (lithium niobate or $LiNbO_3$), and MgO:LN (magnesium oxide-doped lithium niobate or $MgO:LiNbO_3$).

According to a preferred variant, the birefringent nonlinear crystal is chosen from among low-birefringence nonlinear crystals, for example CLBO, LBO, or LN, the applicants having demonstrated that these crystals make it possible to obtain a relative variation in the birefringence through the application of a greater external mechanical force.

Advantageously, the frequency conversion cell further comprises an interface at the level of the stressed face(s), made of a material of lower hardness than that of the nonlinear crystal, in order to obtain better uniformity in the applied force over the entire force application face. The interface is advantageously formed of a deformable, non-compressible material, making it possible to facilitate the sliding of the two solids in contact with either side of the interface, and that has good wettability on the nonlinear crystal, such as for example indium or tin.

According to a variant, the frequency conversion cell further comprises means for adjusting the external mechanical force for wavelength tunability in the conversion cell.

According to a variant, the frequency conversion cell further comprises means for adjusting the applied external mechanical force as a function of the temperature. These adjusting means can make it possible to stabilize the crystal against external thermal fluctuations but also to finely adjust the birefringence by temperature.

According to a variant, the means for applying the external mechanical force comprise a screw for driving a rotationally fixed element in translation. Such a structure makes it possible to transform a torque into a vertical mechanical force and constitutes a simple and economical device for applying very powerful external mechanical forces.

According to a second aspect, the invention relates to a frequency converter system comprising a source for emitting at least one incident laser beam of a given wavelength and a frequency conversion cell according to the first aspect for frequency conversion at said wavelength.

According to a variant, the emitting source of the frequency converter system makes it possible to emit a beam having a wide spectral band, i.e. wider than the spectral acceptance of the birefringent nonlinear crystal, making it possible to obtain wavelength tunability in the frequency converter system when the frequency conversion cell includes means for adjusting the external mechanical force for wavelength tunability in the conversion cell.

According to a third aspect, the invention relates to a frequency conversion method comprising:
  sending of at least one incident laser beam to an input face of a birefringent nonlinear crystal characterized by a first phase-matching wavelength, said crystal also having an output face for emitting at least one frequency-converted beam, and at least two parallel faces different from the input and output faces,
  applying an external mechanical force to at least one of the parallel faces, called a force application face, resulting in a variation in the birefringence of the nonlinear crystal, the value of the applied external mechanical force being determined so as to obtain phase matching in the nonlinear crystal, at a second wavelength different from the first phase-matching wavelength.

Advantageously, the external mechanical force is only applied to one of the two parallel faces, called a force application face, the stress undergone by the nonlinear crystal resulting from the application of the applied mechanical force to this face and from the application of the resulting reaction force on the opposite parallel face. According to a variant, it is possible to apply an external mechanical force to both parallel faces, which makes it possible to obtain a purely compressive stress.

In both cases, the application of the most uniform mechanical force possible over the entire force application face(s) is sought, particularly in order to increase the fracture threshold of the birefringent nonlinear crystal.

Advantageously, the external mechanical force is applied to the force application face(s) through an interface made of a material less hard than the birefringent nonlinear crystal, for example indium or tin, which makes it possible to further increase the uniformity of application of the external mechanical force.

The applied external mechanical force is for example between 10 MPa and 100 GPa.

According to a variant, the frequency conversion method further comprises adjusting the applied external mechanical force for wavelength tunability.

According to a variant, the frequency conversion method further comprises adjusting the applied external mechanical force as a function of the temperature.

BRIEF DESCRIPTION OF THE DRAWINGS

Other advantages and features of the invention will become apparent through the reading of the description, illustrated by the following figures.

DETAILED DESCRIPTION

Figure 1A:
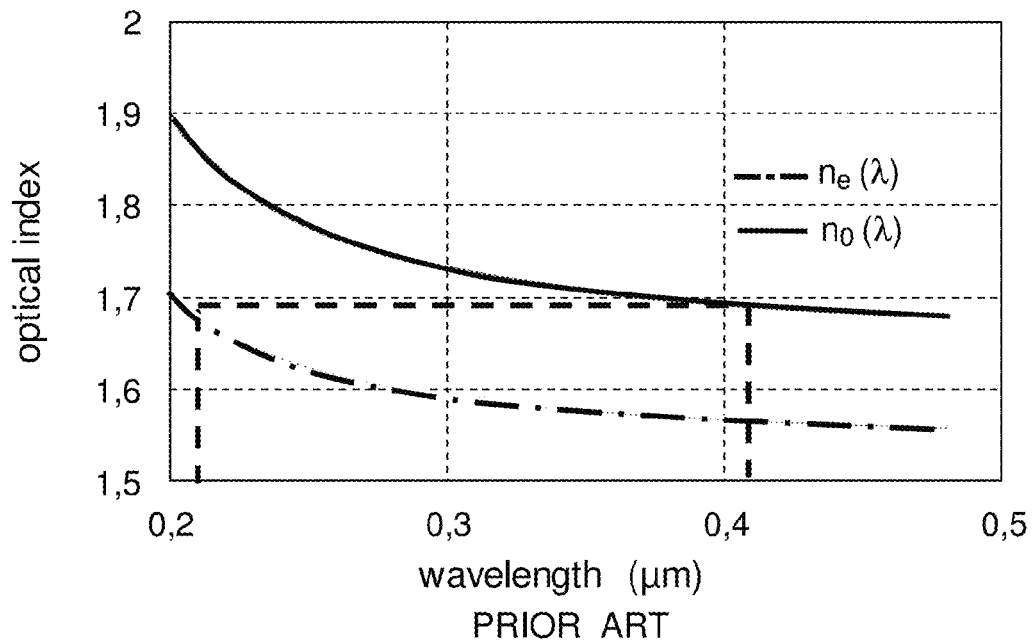
FIGS. 1A and 1B, already described, showing the evolution of the ordinary and extraordinary indices of BBO as a function of the wavelength, and a diagram illustrating the propagation of a polarized incident wave through a crystal with the polarization forming an angle $\theta$ with one of the crystallographic axes of the crystal.
Figure 1B:
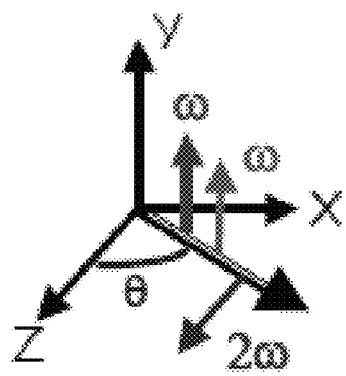
Figure 2:
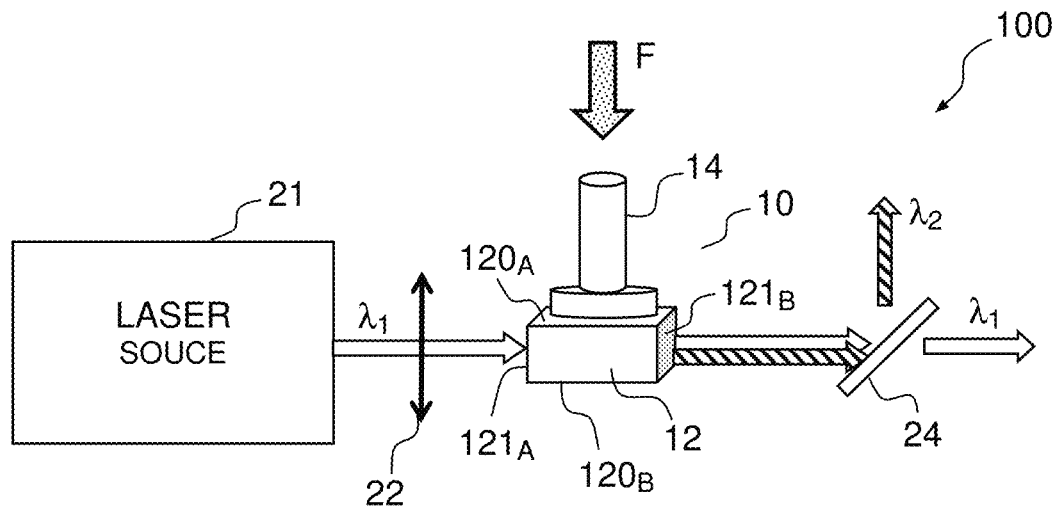
FIG. 2, a diagram illustrating the frequency conversion method with a conversion cell according to the present description.

FIG. 2 generally illustrates a frequency conversion system 100 according to the present description. It comprises a laser source 21 for emitting one or more incident laser beam(s) onto an input face $121_A$ of a birefringent nonlinear crystal 12. The nonlinear crystal 12 is part of a frequency conversion cell 10 which also comprises means 14 for applying an external mechanical force F to at least one face $120_A$ of the nonlinear crystal, said face, called a force application face in the present description, being different from the input face $121_A$ and the output face $121_B$ of the crystal. According to a variant, the external mechanical force can be applied to two parallel faces $120_A$, $120_B$. The system 100 shown in FIG. 2 is for example a frequency doubling system. Thus, an incident beam of wavelength $\lambda_1$ is converted into a beam of wavelength $\lambda_2$. The beams of wavelengths $\lambda_1$ and $\lambda_2$ are separated on output from the conversion cell by means of a wavelength separating plate 24. The frequency conversion system in this example also comprises means 22 for focusing the incident beam inside the nonlinear crystal 12.

Figure 3:
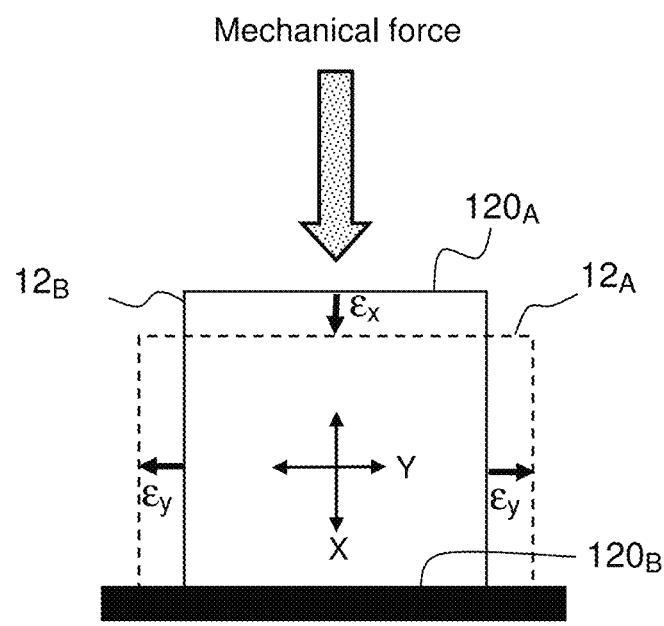
FIG. 3, a diagram illustrating the principle of the deformation of a crystal under stress.
Figure 4:
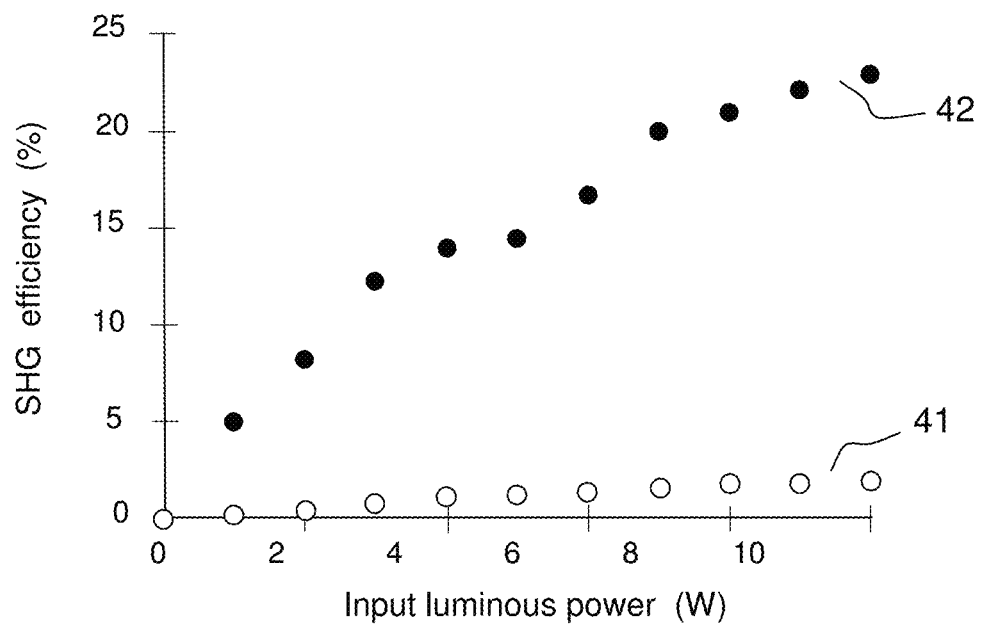
FIG. 4, curves showing initial results of frequency doubling at 1030 nm with an RTP crystal, with and without the application of a mechanical stress.

The principle used to modify the birefringence of the nonlinear crystal is based on the photoelasticity of the material forming the crystal; it is explained below in connection with FIG. 3, and an experimental validation with a nonlinear RTP crystal is shown in FIG. 4.

When a stress $\sigma$ is applied to a material, it causes a local deformation $\epsilon$ of the material, the two values being related by the generalized Hooke's law:

$$\sigma = C\epsilon \quad (1)$$

$$\epsilon = S\sigma \quad (2)$$

where C and S are respectively the elasticity and rigidity matrices of the material in question. The quantities C and S are symmetric fourth order tensors, and the components $\sigma$ and $\epsilon$ are second order tensors. The relations (1) and (2) make it possible to associate the 6 components of the stress tensor $\sigma$ with the 6 components of the deformation tensor $\epsilon$.

The local deformation $\epsilon$ causes a variation in the optical index (a photoelastic effect) according to the expression:

$$\Delta\left(\frac{1}{n_i^2}\right) = \sum_{j=1\ldots3} \rho_{ij}\epsilon_j \quad (3)$$

Where $n_i$ is the refractive index in a preferred direction of the crystal (i) and $\rho_{ij}$ and $\epsilon_j$ are the respective coefficients of the elasto-optic and deformation tensors.

Thus, by applying an external mechanical force to one of the faces of a crystal, whose shape prior to deformation is indicated in solid lines by the reference $12_B$ in FIG. 3, the nonlinear crystal is compressed along the force application axis and stretched along the perpendicular axis (deformed shape indicated in dotted lines by the reference $12_A$ in FIG. 3).

Thus, by applying the external mechanical force along a chosen crystallographic axis, it is possible to increase or decrease the birefringence $\Delta n$ of the nonlinear crystal, where $\Delta n$ is expressed by the equation:

$$\Delta n = n_y(2\omega) - n_z(\omega) \quad (4)$$

Where $n_y$ is the optical index along the Y axis, $n_z$ is the optical index along the Z axis, Y and Z being the crystallographic axes of the crystal, and $\omega$ is the pulsation.

FIG. 4 illustrates a first experimental validation of the principle used in the present description, applied to the conversion efficiency in a frequency doubling (SHG) configuration in an RTP ($RbTiOPO_4$) crystal.

RTP is a nonlinear crystal known to be usable for infrared-to-green second harmonic generation (see for example the article by J. Mangin et al., "Thermal Expansion, normalized thermo-optic coefficients, and conditions for second harmonic generation of a Nd:YAG laser with wide temperature bandwidth in RbTiOPO4." *Journal of the Optical Society of America B*, Vol. 28, no. 4, 2011). While RTP has very advantageous properties for second harmonic generation to 1032 nm, it does not, on the other hand, make birefringent phase matching possible for fundamental wavelengths of less than 1031.6 nm. It therefore cannot be used, for example, with lasers whose gain media are ytterbium-doped materials emitting at 1030 nm. Normally, such a problem can be easily solved by heating the crystal, which makes it possible to shift the phase matching toward shorter wavelengths. However, RTP is insensitive to temperature at around 1030 nm.

A mechanical phase matching is implemented by means of the experimental setup illustrated in FIG. 2.

In this experiment, the laser source 21 is an infrared laser emitting at 1030 nm with enough peak power to obtain a suitable frequency doubling efficiency, i.e. typically more than 50%. At this wavelength, RTP does not allow second harmonic generation. The application of a mechanical force enabled the ordinary and extraordinary optical indices to be changed so as to enable phase matching at 1030 nm.

FIG. 4 thus shows the frequency doubling efficiency (in %) as a function of the incident optic power at 1030 nm, in the case (curve 41) where the crystal is not stressed and in the case (curve 42) where the crystal is subjected to an external mechanical force of several MPa.

Thus, this experimental validation shows that the application of an external mechanical force actually makes it possible to shift the phase matching and thus efficiently generate a beam at 515 nm, a converted wavelength heretofore unobtainable with RTP.

Figure 5:
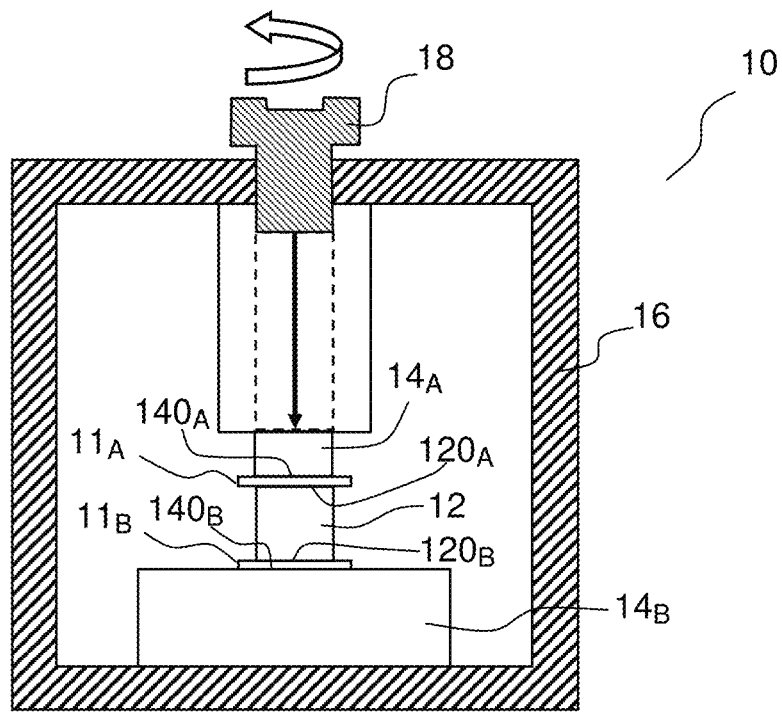
FIG. 5 a diagram of a frequency conversion cell according to an exemplary embodiment.

FIG. 5 shows an exemplary embodiment of a conversion cell 10 that is particularly advantageous for the application of a uniform stress to the faces of the nonlinear crystal. The mounting in this example comprises a non-deformable frame 16, for example a steel frame. A torque is applied to a screw 18 that drives a rotationally fixed element 14A in translation. This element comes into contact with the force application face $120_A$ of the crystal 12, which rests on a fixed element $14_B$ of the frame 16, for example a steel element. A sheet $11_A$ of a material less hard than the nonlinear crystal, for example a sheet of indium or tin, is advantageously disposed at the interface between the face $140_A$ of the element $14_A$ that comes into contact with the force application face $120_A$ of the crystal. A sheet $11_B$ of this same material can also be placed between the face of the fixed element $14_B$ of the frame 16 made to come into contact with the face $120_B$ of the nonlinear crystal, parallel to and opposite the force application face $120_A$.

The applicants performed systematic tests on a certain number of birefringent nonlinear crystals in order to test both the mechanical strength (fracture threshold) and the obtainment of a frequency doubling effect.

In the present description, the fracture threshold is the value of the applied external mechanical force at which the appearance of a "fracture" or "fissure" in the nonlinear crystal is first observed, resulting in a loss of the optical qualities of the crystal, particularly due to the effects of diffusion.

Figure 6A:
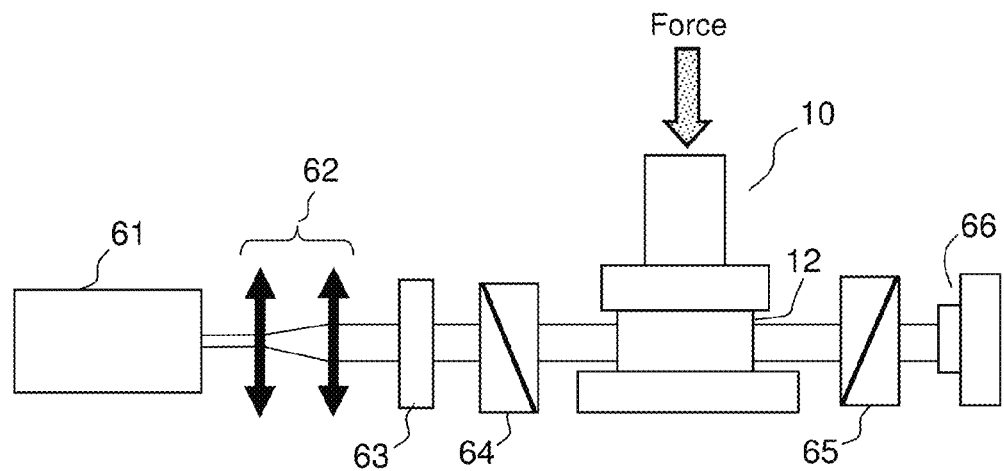
FIGS. 6A and 6B, diagrams of the experimental setups used to characterize the uniformity of the stress applied, the fracture threshold (6A), and the second harmonic generation (6B)
Figure 6B:
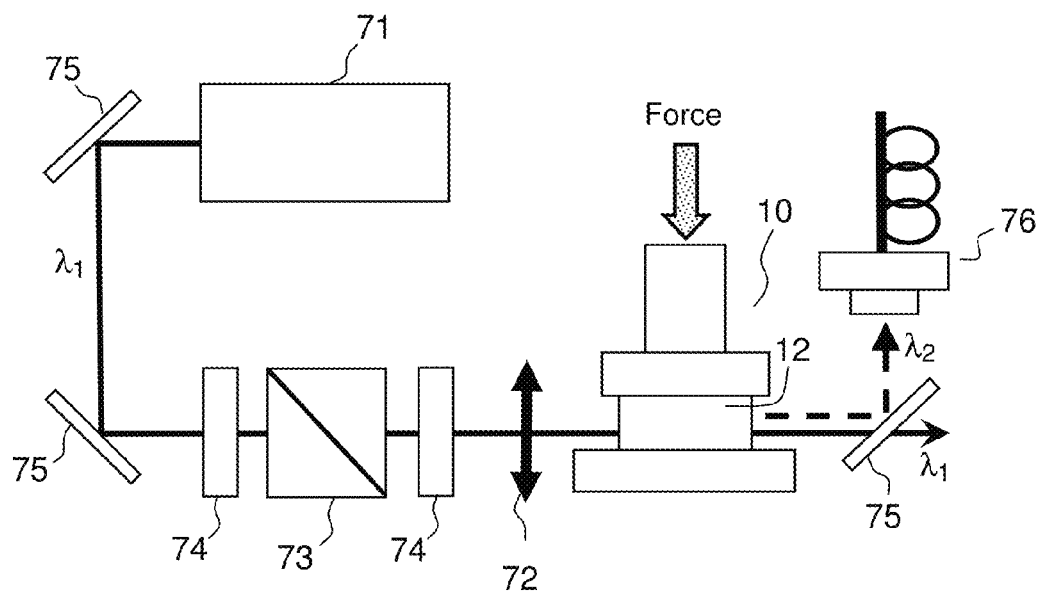

Experimental setups for these tests are shown in FIGS. 6A and 6B, while FIGS. 7A, 7B and 8A through 8C illustrate the results obtained with LBO (LiB$_3$O$_5$).

LBO is a crystal of excellent quality that is widely used for second harmonic generation; it has a wide spectral transparency range of approximately 160 nm to 2 µm, but it is not birefringent enough to produce nonlinear conversions toward the far UV. The applicants have demonstrated that the application of a sufficiently powerful mechanical stress makes it possible to shift the phase matching and to enable fourth harmonic generation in LBO.

The modification of the phase-matching wavelength appears to depend on the amplitude of deformation it can withstand before a fracture appears. The theoretical fracture threshold of a material is sometimes given as one-tenth of the Young's modulus, but the real fracture threshold is often measured at one or two orders of magnitude below this theoretical limit. This threshold depends on the quality of the surface of the crystal (flatness and roughness) and on the homogeneity of the forces applied.

A first experiment, one experimental setup for which is illustrated in FIG. 6A, is performed in order to determine both the fracture threshold of the nonlinear crystal in question and the uniformity of the stress applied to the force application face. The experimental setup comprises a laser source 61 and an afocal lens 62 for forming a collimated laser beam. The laser source is for example a continuous helium-neon laser emitting at 633 nm. The nonlinear crystal 12 to be analyzed is placed in a wavelength conversion cell 10 of the same type as the one illustrated in FIG. 5. The crystal 12 is placed between crossed polarizers, with a half-wave plate 63 associated with a polarizer 64 at the input and a polarizer 65 at the output. The crystallographic axes are placed at 45° to the polarization axes of the two crossed polarizers. A two-dimensional detector 66, for example a CMOS camera, is positioned so as to be able to observe the patterns of interference formed after the passage of the light through the crystal and resulting from the phase difference between the neutral axes.

More precisely, the conversion cell 10, for example of the same type as the one illustrated in FIG. 5, is designed to mechanically apply a vertical external mechanical force and to prevent the effects of parasitic torque. In the experimental tests presented in these examples, forces between 0 and 12 kN are applied with a precision of +/−0.1 kN. The external mechanical force is applied by means of an element whose face made to come into contact with the face of the nonlinear crystal is polished and has a section measuring 4×12 mm$^2$. If the stress applied is not uniform, the local stress point can cause a premature fracture of the crystal. As explained above, the interface between the nonlinear crystal and the force application element can be adapted so as to increase the uniformity of the force applied to the entire application face of the crystal. Thus, the effect of using indium as an interface material to increase uniformity has been tested. Indium is a very flexible material that can wet metal surfaces, and can thus sharply reduce any defects between the face of the nonlinear crystal and the face of the element made to come into contact.

Figure 7A:
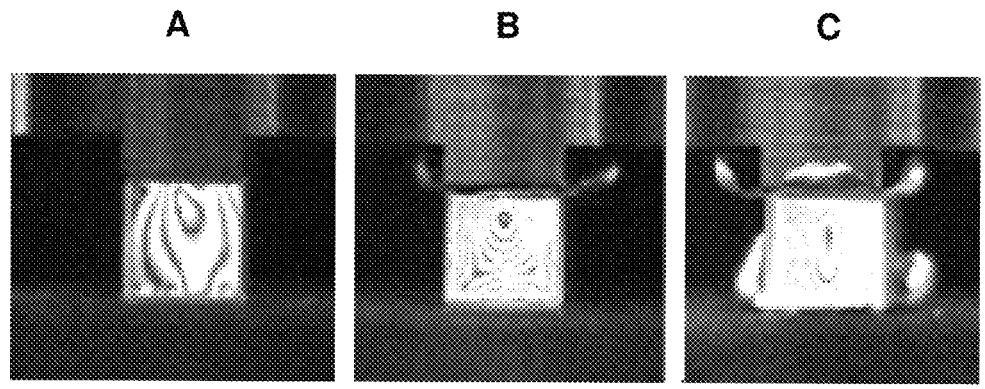
FIGS. 7A and 7B, experimental results showing the influence of an interface made of indium on the uniformity of the stress and on the fracture threshold, respectively.

FIG. 7A shows the interference figures recorded with the camera 66 when a nonlinear LBO crystal is used, in three configurations A, B, C; The LBO crystal in this example is cut along the X axis and stressed along its Z axis by an external mechanical force with a modulus just below the fracture threshold. Configurations A, B, C respectively correspond to a configuration in which there is no indium interface, a configuration in which an indium interface is used only on the top face of the nonlinear crystal, and a configuration in which indium interfaces are present on every face of the crystal. Configuration A shows that the force applied is not uniform. With configuration B, the force is uniform but stresses appear in the lower corners of the crystal, since the bottom face of the crystal is having trouble deforming. In configuration C, the bottom face can slide relative to the mounting thanks to the indium interface and can therefore deform. The figure is symmetrical, and the top and bottom faces are deformed in the same way.

Figure 7B:
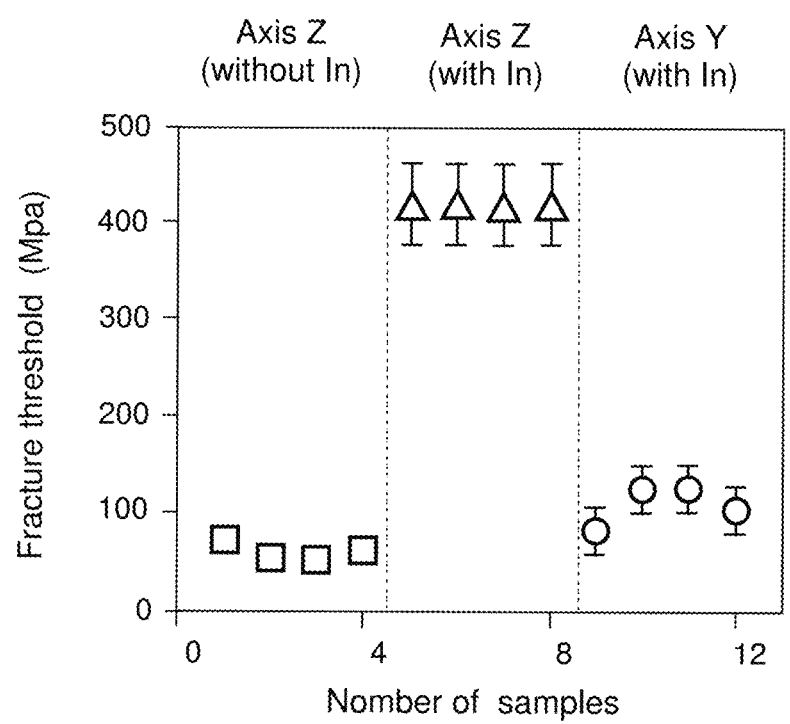

FIG. 7B shows the fracture threshold of samples in different configurations. In the first configuration (illustrated in the left column of FIG. 7B), the LBO crystal is stressed directly, with no interface material along its Z axis. There is little uniformity in the stress on the face of the crystal, and fissures are observed to appear on the bottom surface. The maximum applicable stress measured in this case is 30 Mpa. When a 200 µm sheet of indium is inserted between the face of the crystal and the face of the element applying the mechanical force (the configuration illustrated in the center column of FIG. 7B), the fracture threshold is increased to 400 Mpa. In this configuration, however, the lower corners of the nonlinear crystal suffer from increased stress due to the fact that the bottom surface is unable to stretch. If a second sheet of indium is inserted under the bottom face of the nonlinear crystal, the induced birefringence becomes very uniform and the damage threshold increases to 500 Mpa. FIG. 7B illustrates a third configuration, in which the LBO crystal is stressed along the Y axis. In this case, the damage threshold falls to 100 MPa, due to the anisotropy of the elasto-optic coefficients of LBO.

Figure 8A:
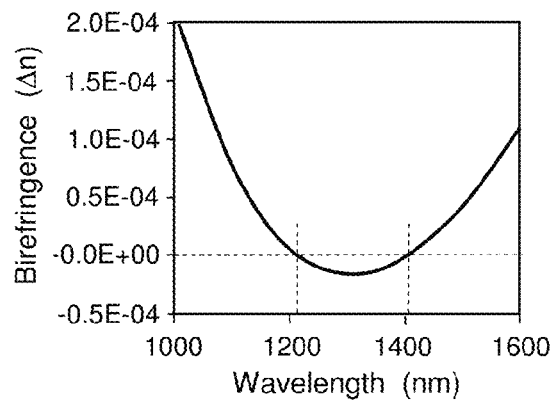
FIGS. 8A through 8C, experimental results obtained with LBO.
Figure 8B:
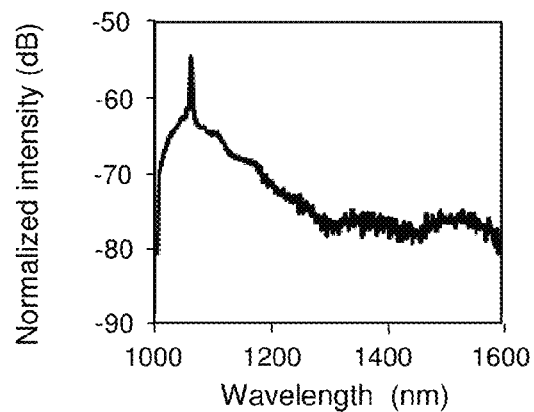
Figure 8C:
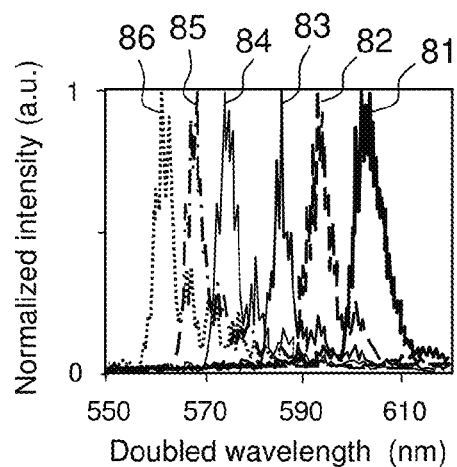

FIGS. 8A through 8C illustrate the frequency-doubling results obtained with an LBO crystal. The experimental setup used is shown in FIG. 6B.

In a negative biaxial crystal like an LBO crystal, the condition for non-critical phase matching in a type I second harmonic generation process is expressed as follows:

$$n_z(\omega) = n_y(2\omega) \quad (5)$$

Combined with the Sellmeier equation which gives the refractive index n as a function of the wavelength, it is possible to calculate the birefringence Δn (given by equation (4) above) as a function of the wavelength λ; the curve in the case of an "X-cut" LBO crystal (cut in the plane θ=90°) is illustrated in FIG. 8A. In this configuration, the fundamental wave propagates with an electric field parallel to the Z axis and the frequency-doubled wave propagates with an electric field parallel to the Y axis. FIG. 8A shows that the phase matching condition is fulfilled at ambient temperature (Δn=0) for two wavelengths, i.e. 1200 nm and 1400 nm. A change in the phase-matching wavelength in the interval between 1200 nm and 1400 nm therefore requires an increase in the birefringence while a change in the phase-matching wavelength to values lower than 1200 nm or greater than 1400 nm requires a reduction in the birefringence.

A harmonic generation experiment with the stressed LBO crystal is conducted using the experimental setup illustrated in FIG. 6B. The setup includes a fiber laser source 71 that delivers radiation in a spectral band between 400 nm and 2 µm with nonlinear effects (called a white supercontinuum) and emits picosecond pulses with an optical power of up to 4 W, with a repetition rate of 40 MHz. The signal is filtered by means of dichroic mirrors 75, 76 so as to obtain a spectral band in the infrared (between 1000 and 1600 nm). The intensity distribution of the filtered pulses as a function of the wavelength is measured with an optical spectrum analyzer and is illustrated in FIG. 8B. The residual radiation between 1000 nm and 1600 nm is focused inside the nonlinear crystal 12 by means of a focusing lens 74 and has a focus diameter of approximately 50 μm inside the crystal. The wavelength of the frequency-doubled wave is measured with a visible spectrometer 76 (190-600 nm, resolution +/−0.3 nm). Care is also taken to ensure that the nonlinear crystal is properly aligned with the phase matching angle. In the experiment thus performed, the LBO crystal is stressed along the Y axis, and the birefringence is increased. The phase-matching wavelength can thus be expected to decrease to less than 1200 nm. An external mechanical force is applied to the surface of the crystal up to a value of 100 MPa, which corresponds to the fracture threshold of the crystal. The results are shown in FIG. 8C, which illustrates the normalized intensity as a function of the wavelength. A shift in the phase-matching wavelength from 1200 nm to 1120 nm is observed.

The experiments thus performed validate the method described in the present description for modifying the phase-matching wavelength of a birefringent nonlinear crystal through the application of a mechanical force. They verify that the amplitude of this modification is limited only by the fracture threshold of the material. These results may be compared to the change in the phase-matching wavelength induced by the temperature in a nonlinear LBO crystal, as described for example in the article by T. Ukachi et al. cited above. By applying a mechanical stress, the applicants demonstrated that that it was possible to change the phase-matching wavelength by a value equal to that resulting from a temperature increase of about 60° C. Furthermore, in these experiments, no particular treatment was applied to the stressed faces. An optical polishing of the stressed faces of the crystal and/or a chemical etching can be expected to enable an increase in the fracture threshold of the crystal by up to 10 times, making it possible to expand even further the range of modification of the phase-matching wavelength.

Other birefringent nonlinear crystals have proved promising for the use of a conversion cell according to the present description.

Thus, LTB (LB$_4$) is a UV-transparent nonlinear crystal that is sufficiently birefringent to produce a fourth harmonic generation. But its nonlinear properties are not sufficient to obtain satisfactory conversion efficiency, except in a non-critical phase matching configuration (crystal cut along one of its optical axes), in which its properties become very advantageous. Since this crystal is also not very temperature-sensitive, only a few specific types of phase matching are possible. The application of a mechanical stress according to the present description makes it possible to expand the phase matching capabilities of this crystal in a non-critical configuration.

Furthermore, the method described in the present description is a passive technique, which does not require a power supply once the stress is applied. In addition, the method described only requires the use of mechanical elements and could be designed into a low-cost frequency conversion system. Although the experimental validations have been described in the particular case of non-critical phase matching, the method described applies to any nonlinear process requiring a modification of the birefringence.

Although it has been described in a certain number of detailed exemplary embodiments, the frequency conversion method and device according to the invention include different variants, modifications, and improvements that will be obvious to a person skilled in the art, it being understood that these different variants, modifications, and improvements fall within the scope of the invention as defined by the following claims.

The invention claimed is:

1. A frequency converter system comprising:
   a source that emits a beam having a wide spectral band; and
   a frequency conversion cell comprising:
   a birefringent nonlinear crystal having a first phase-matching wavelength, comprising an input face that receives the beam, an output face that emits at least one frequency-converted beam, and at least two parallel faces different from the input and output faces;
   means for applying an external mechanical force to at least one of said two parallel faces, resulting in a variation in the birefringence of the nonlinear crystal, the value of the applied external mechanical force being determined so as to obtain phase matching at a second phase-matching wavelength different from the first phase-matching wavelength; and
   means for adjusting the external mechanical force for wavelength tunability in the frequency conversion cell.

2. The frequency converter system according to claim 1, wherein the external mechanical force is applied in a uniform way to the at least one of said two parallel faces.

3. The frequency converter system according to claim 1, wherein the frequency conversion cell further comprises an interface made of a material softer than the nonlinear crystal at a surface of the at least one of said two parallel faces.

4. The frequency converter system according to claim 1, wherein the frequency conversion cell further comprises means for adjusting the external mechanical force as a function of the temperature.

5. The frequency converter system according to claim 1, wherein the means for applying the external mechanical force comprise a screw for driving a rotationally fixed element in translation.

6. The frequency converter system according to claim 1, wherein the birefringent nonlinear crystal is cut along its principal planes, and wherein an incident beam penetrates through the nonlinear crystal along an axis of propagation perpendicular to the input face, allowing non-critical phase matching.

7. The frequency converter system according to claim 1, wherein the birefringent nonlinear crystal is chosen from the group consisting of: CLBO, LBO, and LN.

8. A frequency conversion method comprising:
   sending of at least one incident beam to an input face of a birefringent nonlinear crystal having a first phase-matching wavelength, said crystal also comprising an output face that emits at least one frequency-converted beam and at least two parallel faces different from the input and output faces;
   applying an external mechanical force to at least one of the two parallel faces, resulting in a variation in the birefringence of the nonlinear crystal, the value of the applied external mechanical force being determined so as to obtain phase matching in the nonlinear crystal at a second phase-matching wavelength different from the first phase-matching wavelength; and
   adjusting the applied external mechanical force for wavelength tunability.

9. The frequency conversion method according to claim 8, wherein the applied external mechanical force is between 10 MPa and 100 GPa.

10. The frequency conversion method according to claim 8, wherein the external mechanical force is applied to the at least one of the two parallel faces through an interface made of a material softer than the nonlinear crystal.

11. The frequency conversion method according to claim 8, further comprising adjusting the applied external mechanical force as a function of the temperature.

* * * * *